US006460689B2

(12) United States Patent
Albrecht et al.

(10) Patent No.: US 6,460,689 B2
(45) Date of Patent: Oct. 8, 2002

(54) INNER BOOK CONVEYING CHANNEL

(75) Inventors: Manfred Albrecht, Lübbecke; Dietmar Schwettmann, Rahden-Varl, both of (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

(21) Appl. No.: 09/774,512

(22) Filed: Jan. 31, 2001

(65) Prior Publication Data

US 2001/0050211 A1 Dec. 13, 2001

(30) Foreign Application Priority Data

Feb. 12, 2000 (DE) ........................................ 100 06 328

(51) Int. Cl.[7] ................................................ B65G 19/18
(52) U.S. Cl. ................................. 198/735.3; 198/836.3
(58) Field of Search .......................... 198/735.1, 735.3, 198/836.3; 270/52.16, 52.18, 58.29

(56) References Cited

U.S. PATENT DOCUMENTS 1,824,228 A * 9/1931 Perry ...................... 198/836.3
3,858,711 A * 1/1975 Barker .................... 198/836.3
5,080,217 A * 1/1992 Garlichs et al. ......... 198/735.3

* cited by examiner

*Primary Examiner*—Joseph E. Valenza
(74) *Attorney, Agent, or Firm*—Alix, Yale & Ristas, LLP

(57) ABSTRACT

In the case of an inner book conveying channel having mutually adjustable lateral guides and having a height-adjustable inner book support, on which inner books are fed in an upright position while being laterally supported, for operationally reliable conveying of very thin inner books an inner book support (2) is provided with bottom lateral guides (9), which are preferably arranged on either side and height-adjustable jointly with the inner book support (2), and with middle lateral guides (12), which are positioned between the bottom lateral guides (9) and top lateral guides (11). Said middle lateral guides are freely displaceable along vertical guides and by virtue of height adjustment of the inner book support (2) are liftable by the bottom lateral guides (9) into a vertically offset position.

18 Claims, 1 Drawing Sheet

INNER BOOK CONVEYING CHANNEL

BACKGROUND OF THE INVENTION

The invention relates to an inner book conveying channel having mutually adjustable lateral guides and having a height-adjustable inner book support, on which inner books are fed in an upright position while being laterally supported.

From DE-OS 40 12 084 such an inner book conveying system is known, whereby the exchanging of the inner book webs is discontinued and so the set-up time is substantially reduced. To this end, an inner book web comprises support prongs jutting out on both sides as well as lateral guides in the form of racks, through which the support prongs engage. The inner book web with the support prongs is vertically adjustable in the racks and the racks are horizontally adjustable. For operationally reliable passage of the inner books, angular rails are situated in the inner book conveying channel and bridge the open regions between the support prongs and the adjoining, upwardly extending open regions between the struts of the racks.

SUMMARY OF THE INVENTION

The object of the invention is to propose an inner book conveying channel of the type described, in which very thin inner books may be conveyed in an operationally reliable and protected manner and with which conversion to different inner book thickness' may be effected within the shortest possible time and with a minimum of effort.

Said object is achieved by an inner book support and by bottom lateral guides preferably arranged on either side and height-adjustable jointly with the inner book support and by middle lateral guides, which are positioned between the bottom lateral guides and top lateral guides and are freely displaceable along vertical guides and by virtue of height adjustment of the inner book support are liftable by the bottom lateral guides into a vertically offset position. Further advantageous refinements arise from the dependent claims.

BRIEF DESCRIPTION OF THE DRAWING

The invention is described in detail with reference to an embodiment, which is illustrated in the drawings. The drawings show.

DESCRIPTION OF THE PREFERRED EMBODIMENT

Figure 1:
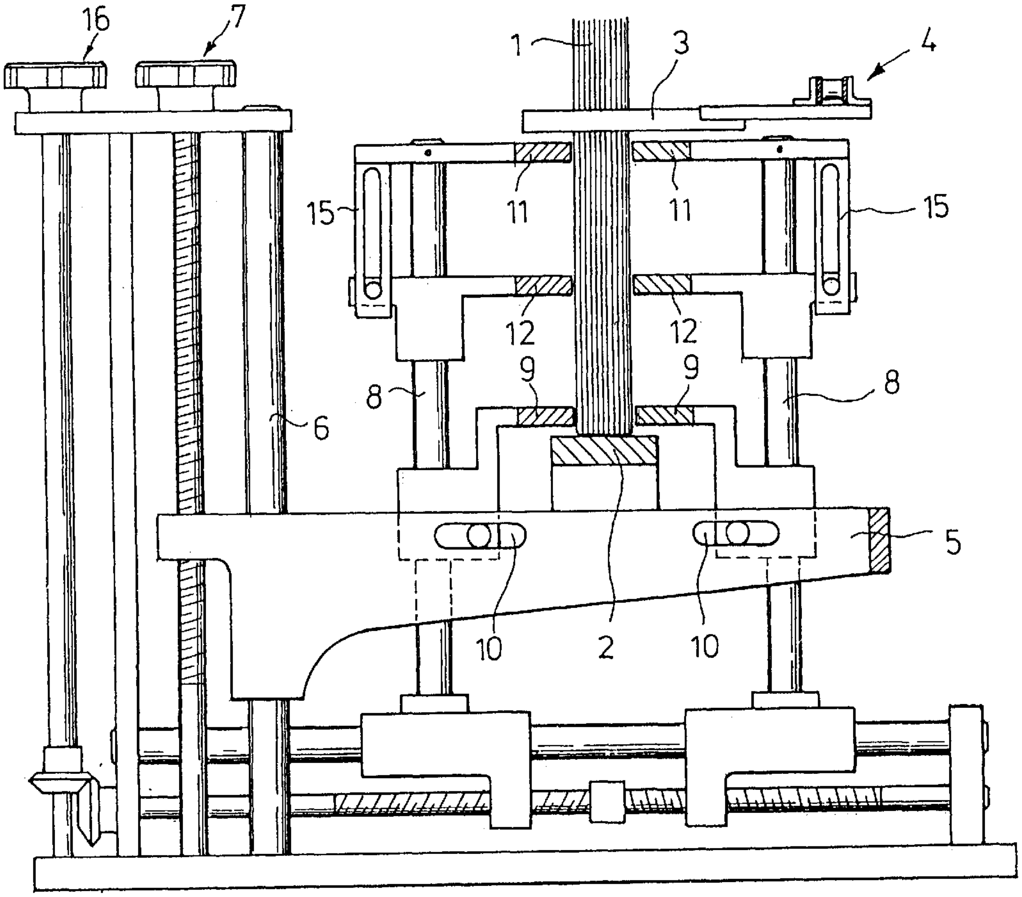
FIG. 1 A front, part-sectional view of an inner book conveying channel.

The inner book-conveying channel according to the invention is provided as a feed track for an adjoining book binding machine. The inner books 1 are fed, in an upright position on an inner book support in the form of a longitudinally extending inner book web 2 and while being laterally supported, by a conveyor 4 having drivers 3 which extend beyond the plane of motion of the inner books 1. The inner book web 2 at its ends is situated on brackets 5, which are displaceable along vertical guides 6 and height-adjustable in accordance with the formats of the inner books 1 by means of manually operable adjusting devices 7. Instead of the inner book web 2, a roller conveyor compatible with the brackets 5 or a driven conveyor belt may be used, thereby making it possible to dispense with the drivers 3.

For lateral support of the inner books 1 in the inner book conveying channel, longitudinally extending bottom lateral guides 9 are situated in a freely displaceable manner on vertical columns 8 and guided so as to be horizontally displaceable in oblong holes 10 of the brackets 5 and overlap the inner book web 2 with slight clearance. Positioned at a defined distance between the bottom lateral guides 9 and top lateral guides 11, which are supported in a fixed manner on the vertical columns 8 and extend in longitudinal direction, are middle lateral guides 12, which are freely displaceable on the vertical columns 8, extend in longitudinal direction and, during the height adjustment of the inner book web 2 carried by the brackets 5, are driven by the bottom lateral guides 9 into vertically offset positions corresponding to the format of the inner books 1.

Figure 2:
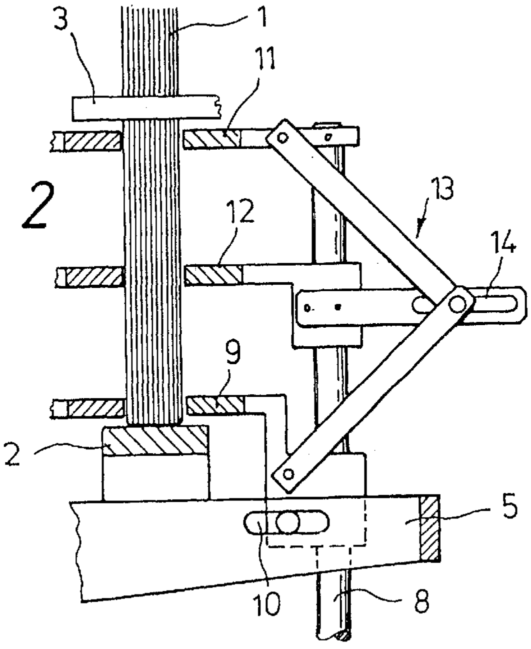
FIG. 2 An individual view of a modified construction of driving means for adjusting the middle lateral guides.

To optimise the lateral support of the inner books 1, instead of being directly driven by the bottom lateral guides 9, the freely displaceable middle lateral guides 12 may be brought via a link guide 14 with a connecting rod arrangement 13 between the top 11 and bottom lateral guides 9 indirectly by the bottom lateral guides 9 into a vertically offset position mid-way between the lateral guides 9 and 11, as is shown clearly by the individual view in FIG. 2.

The freely displaceable middle lateral guides 12 are held in their starting position at a defined distance from the bottom lateral guides 9 by means of fixed, vertical oblong hole guides 15.

By means of manually operable adjusting devices 16 the lateral guides 9, 11 and 12 may be jointly adjusted in the direction of the middle of the inner book channel, during which adjustment the bottom lateral guides 9 are displaced horizontally in the oblong holes 10 of the brackets 5.

It has proved particularly advantageous for operationally reliable conveying of the inner books 1 when, in a further development, the drivers 3 of the conveyor 4 are height-adjustable in accordance with the format width of the inner books 1, preferably jointly with the top lateral guides 11.

The height adjustments of the inner book support 2 with the lateral guides 9 and 12 in accordance with the formats of the inner books 1, the height adjustments of the lateral guides 11 and the drivers 3, and the adjustments of the lateral guides 9, 11 and 12 in the direction of the middle of the inner book conveying channel may be effected in a computer-controlled manner, instead of by manual operation.

What is claimed is:

1. Inner book conveying channel having mutually adjustable lateral guides and having a height-adjustable inner book support, on which associated inner books are fed in an upright position while being laterally supported, characterised by an inner book support (2) and by bottom lateral guides (9) preferably arranged on either side and height-adjustable jointly with the inner book support (2) and by middle lateral guides (12), which are positioned between the bottom lateral guides (9) and top lateral guides (11) and are freely displaceable along vertical guides (8) and by virtue of height adjustment of the inner book support (2) are liftable by the bottom lateral guides (9) into a vertically offset position.

2. Inner book conveying channel according to claim 1, characterised in that the lateral guides (9, 11 and 12) are jointly adjustable in the direction of the middle of the inner book-conveying channel by means of adjusting devices (16).

3. Inner book conveying channel according to claim 1, characterised in that the bottom lateral guides (9) are disposed directly above the inner book support (2).

4. Inner book conveying channel according to claim 1, characterized in that a plurality of freely displaceable middle lateral guides (12) are positionable a mutual distance apart between the bottom and top lateral guides (9–11) and are successively liftable by the bottom lateral guides (9).

5. Inner book conveying channel according to claim 1, characterised in that the freely displaceable middle lateral guides (12) are liftable by virtue of direct support on the bottom lateral guides (9).

6. Inner book conveying channel according to claim 1, characterised in that the freely displaceable middle lateral guides (12) are liftable indirectly via a link guide (14) with connecting rod arrangement (13) between the bottom (9) and top lateral guides (11).

7. Inner book conveying channel according to claim 1, characterised by drivers (3) of a conveyor (4), which engage behind the inner books (1) for feed purposes and extend beyond the plane of motion of the inner books (1).

8. Inner book conveying channel according to claim 1, characterised in that the drivers (3) and the top lateral guides (11) are height-adjustable.

9. Inner book conveying channel according to claim 8, characterised in that the drivers (3) and the top lateral guides (11) are jointly adjustable.

10. Inner book conveying channel according to claim 8, characterized in that the height adjustments of the inner book support (2) with the lateral guides (9, 12), the height adjustments of the lateral guides (11) and the drivers (3), and the adjustments of the lateral guides (9, 11 and 12) in the direction of the middle of the inner book conveying channel are effectable in a computer-controlled manner.

11. Apparatus for conveying a sequence of inner books which comprises:

a longitudinally extending inner book support dimensioned and configured for supporting inner books in an upright position as conveyed in a channel, said support having a top support surface defining a bottom of the channel and first and second laterally opposed sides, the associated inner books being oriented on said support surface with a front face substantially parallel to said first side and a back face substantially parallel to said second side;

a set of first and second bottom lateral guides disposed respectively on opposed sides of said channel, said first and second bottom lateral guides being respectively dimensioned and configured for abutting engagement with the front face and the back face of an inner book on said support surface;

a set of first and second top lateral guides disposed respectively on opposed sides of said channel, said first and second top lateral guides being spaced from the bottom lateral guides and respectively dimensioned and configured for abutting engagement with the front face and the back face of an inner book on said support surface;

a set of first and second middle lateral guides disposed respectively on opposed sides of said channel, said first and second middle lateral guides being spaced between the top and bottom lateral guides and respectively dimensioned and configured for abutting engagement with the front face and the back face of an inner book on said support surface;

first means for lifting said longitudinally extending inner book support together with said set of first and second bottom lateral guides through a total vertical adjustment distance, and whereby the set of first and second middle lateral guides are associated with the inner book support such that said lifting over at least a portion of said total vertical distance simultaneously adjusts the space between the middle and bottom lateral guides.

12. The apparatus for conveying associated inner books in accordance with claim 11, wherein said first means couples said longitudinally extending inner book support and said set of first and second bottom lateral guides.

13. The apparatus for conveying inner books in accordance with claim 12, wherein said first means allows relative motion between said longitudinally extending inner book support and said set of first and second bottom lateral guides in a direction that is lateral with respect to the associated inner book.

14. The apparatus for conveying inner books in accordance with claim 11, wherein said association includes second means for physically linking all of said sets of first and second lateral guides.

15. The apparatus for conveying inner books in accordance with claim 11, wherein said apparatus further includes at least a first generally vertical column and each of said set of first and second lateral bottom guides and middle guides includes a first collar dimensioned and configured for sliding axial movement along said first generally vertical column.

16. The apparatus for conveying inner books in accordance with claim 15, wherein said apparatus further includes at least a second generally vertical column and each of said first and second lateral bottom guides and middle guides includes a second collar dimensioned and configured for sliding axial movement along said second generally vertical column.

17. The apparatus for conveying inner books in accordance with claim 16, further including means for adjusting the distance between said first and second generally vertical columns.

18. The apparatus for conveying inner books in accordance with claim 14, wherein said set of top lateral guides is in fixed vertical elevation and said second means for physically linking includes a plate fixed to one of said first and second middle lateral guides, said plate having an oblong hole defined therein and further including first and second connecting rods connected together by a pin dimensioned and configured for sliding engagement with said oblong hole, said first connecting rod further including a pivotal connection to one of said first and second bottom lateral guides, said second connecting rod further including another connection to one of said first and second top lateral guides.

* * * * *